United States Patent
Muramoto et al.

(10) Patent No.: US 6,523,044 B1
(45) Date of Patent: Feb. 18, 2003

(54) COLLECTING, STORING, AND RETRIEVING KNOWLEDGE WITHIN AN ORGANIZATION

(75) Inventors: Tetsuya Muramoto, Kawasaki (JP); Masayoshi Kikuchi, Kawasaki (JP); Ryusuke Masuoka, Kawasaki (JP); Hironobu Kitajima, Kawasaki (JP); Nobuhiro Yugami, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/187,744

(22) Filed: Nov. 9, 1998

(30) Foreign Application Priority Data

Dec. 19, 1997 (JP) .............................................. 9-351679

(51) Int. Cl.$^7$ .............................................. G06F 17/30
(52) U.S. Cl. ........................... 707/103 Y; 707/2; 707/7; 709/201
(58) Field of Search ................................ 707/103, 2, 7, 707/103 Y, 1; 705/1–17; 709/10, 203, 201

(56) References Cited

U.S. PATENT DOCUMENTS

| | | | | |
|---|---|---|---|---|
| 5,659,732 A | * | 8/1997 | Kirsch ............................ | 707/5 |
| 5,659,734 A | * | 8/1997 | Tsuruta et al. .................. | 707/8 |
| 5,732,397 A | * | 3/1998 | De Tore et al. ................. | 705/1 |
| 5,832,470 A | * | 11/1998 | Morita et al. ................... | 707/1 |
| 5,857,185 A | * | 1/1999 | Yamaura ......................... | 707/6 |
| 5,924,072 A | * | 7/1999 | Havens ........................... | 705/1 |
| 5,926,808 A | * | 7/1999 | Evans et al. .................... | 707/3 |
| 5,953,732 A | * | 9/1999 | Meske, Jr. et al. ........... | 707/513 |
| 5,991,751 A | * | 11/1999 | Rivette et al. .................. | 707/1 |
| 6,018,733 A | * | 1/2000 | Kirsch et al. ................... | 707/3 |
| 6,081,814 A | * | 6/2000 | Mangat et al. ............... | 707/501 |
| 6,092,080 A | * | 7/2000 | Gustman .................... | 707/103 |
| 6,199,067 B1 | * | 3/2001 | Geller .......................... | 707/10 |
| 6,243,724 B1 | * | 6/2001 | Mander et al. ............. | 707/526 |

* cited by examiner

*Primary Examiner*—John Breene
*Assistant Examiner*—Cheryl Lewis

(57) ABSTRACT

A method of collecting, storing, and retrieving knowledge includes the steps of collecting knowledge information from information-source terminals via a network, the knowledge information including information regarding research and development, problems, and solutions of the problems, storing the collected knowledge information in libraries by classifying the collected knowledge information based on a type and an attribute of the collected knowledge information, organizing the stored knowledge information based on importance and frequency of use thereof, storing the organized knowledge information in the libraries after standardizing the organized knowledge information so as to be usable by others, and retrieving the standardized knowledge information from a library in response to a retrieval request so as to provide the retrieved information for a requesting party which made the retrieval request.

13 Claims, 16 Drawing Sheets

FIG. 4

| DOCUMENT ATTRIBUTE | PHYSICAL LOCATION OF STORAGE |
|---|---|
| PROPOSAL DOCUMENT | D : ¥project-A¥filder 0 1 |
| SCHEMATIC-DESIGN DOCUMENT | D : ¥project-A¥filder 0 2 |
| RECORD OF PROCEEDINGS | D : ¥project-A¥filder 0 3 |
| TROUBLE RECORD | D : ¥project-A¥filder 0 4 |
| PROPOSAL DOCUMENT | D : ¥project-A¥filder 0 5 |
| COLLECTION OF REUSABLE TOOLS | D : ¥project-A¥filder 0 6 |

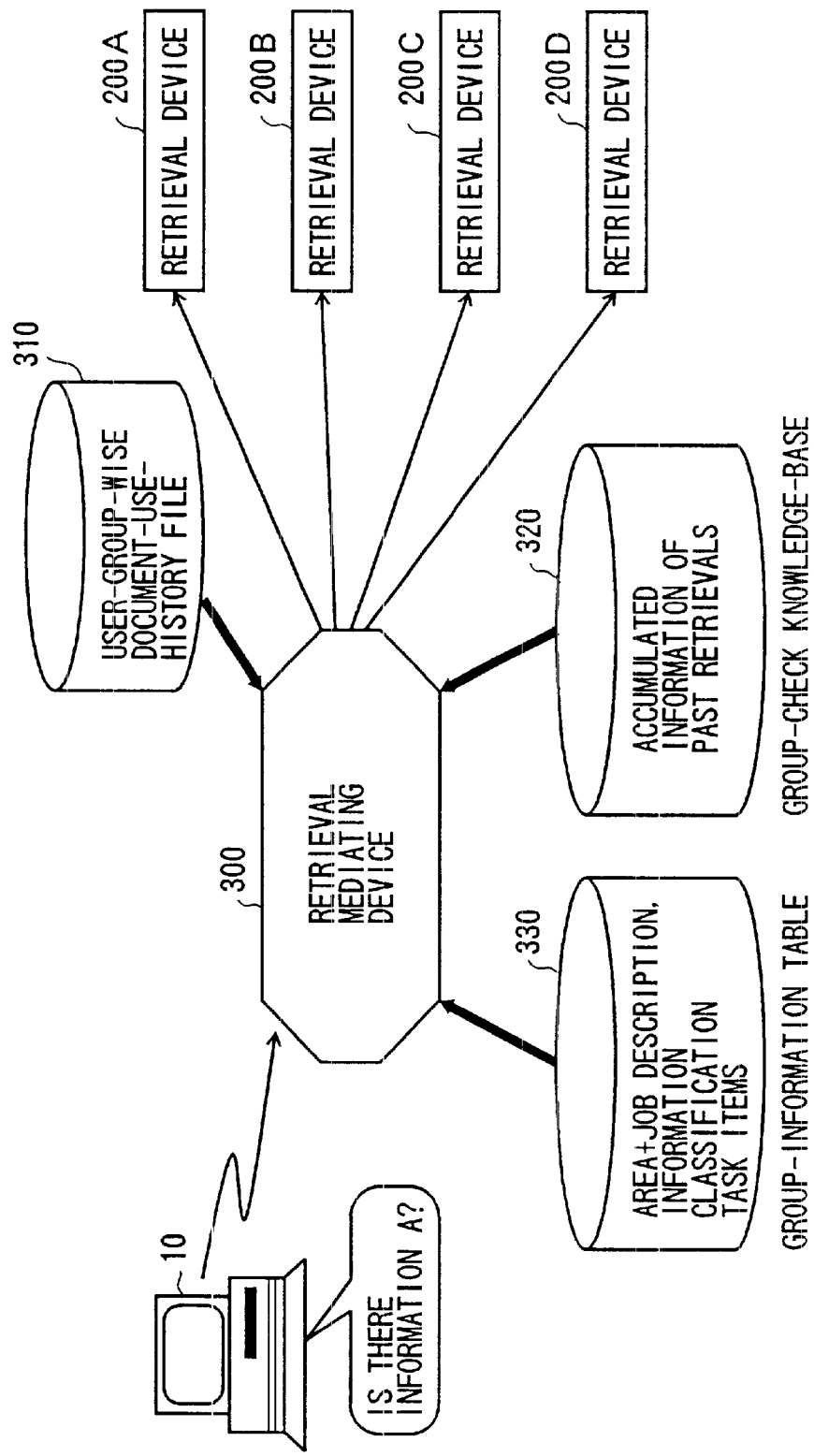

| AREA+JOB-DESCRIPTION GROUP |
|---|
| RETRIEVAL DEVICE NAME; AREA ; JOB DESCRIPTION; COUNTENT KEY ; TIME STAMP |
| RETRIEVAL DEVICE A ; TOKAI ; FINANCE ; PROPOSAL DOCUMENT; 1997/12/20 19:00 |

FIG. 8B

| INFORMATION-CLASSIFICATION GROUP |
|---|
| RETRIEVAL DEVICE NAME; ATTRIBUTE INFORMATION A |
| RETRIEVAL DEVICE B ; DETAILED DESIGN DOCUMENT |

FIG. 8C

| WORK-PROCEDURE GROUP |
|---|
| RETRIEVAL DEVICE NAME; WORK PROCEDURE ; ATTRIBUTE INFORMATION1, ATTRIBUTE INFORMATION2 , .... |
| RETRIEVAL DEVICE NAME; DESIGN ; DETAILED-DESIGN DOCUMENT ; PRODUCT INFORMATION |

| USER ID | DATE | SEARCH KEYWORD | DOCUMENT-LIBRARY ID | DOCUMENT ID |
|---|---|---|---|---|

| USER-GROUP ID | DOCUMENT-LIBRARY ID | DOCUMENT ID | FREQUENCY OF USE |
|---|---|---|---|

| USER ID | KEYWORD | FREQUENCY OF USE |
|---------|---------|------------------|

FIG. 14A

- DOCUMENT+KEYWORD TABLE

350

| DOCUMENT-LIBRARY ID | DOCUMENT ID | KEYWORD LIST |
|---|---|---|

FIG. 14B

- DOCUMENT+EVALUATION TABLE

| DOCUMENT-LIBRARY ID | DOCUMENT ID | EVALUATION 1 | EVALUATION 2 | EVALUATION 3 |
|---|---|---|---|---|

FIG. 14C

- DOWNLOAD-FREQUENCY TABLE

| DOCUMENT-LIBRARY ID | DOCUMENT ID | DOWNLOAD FREQUENCY |
|---|---|---|

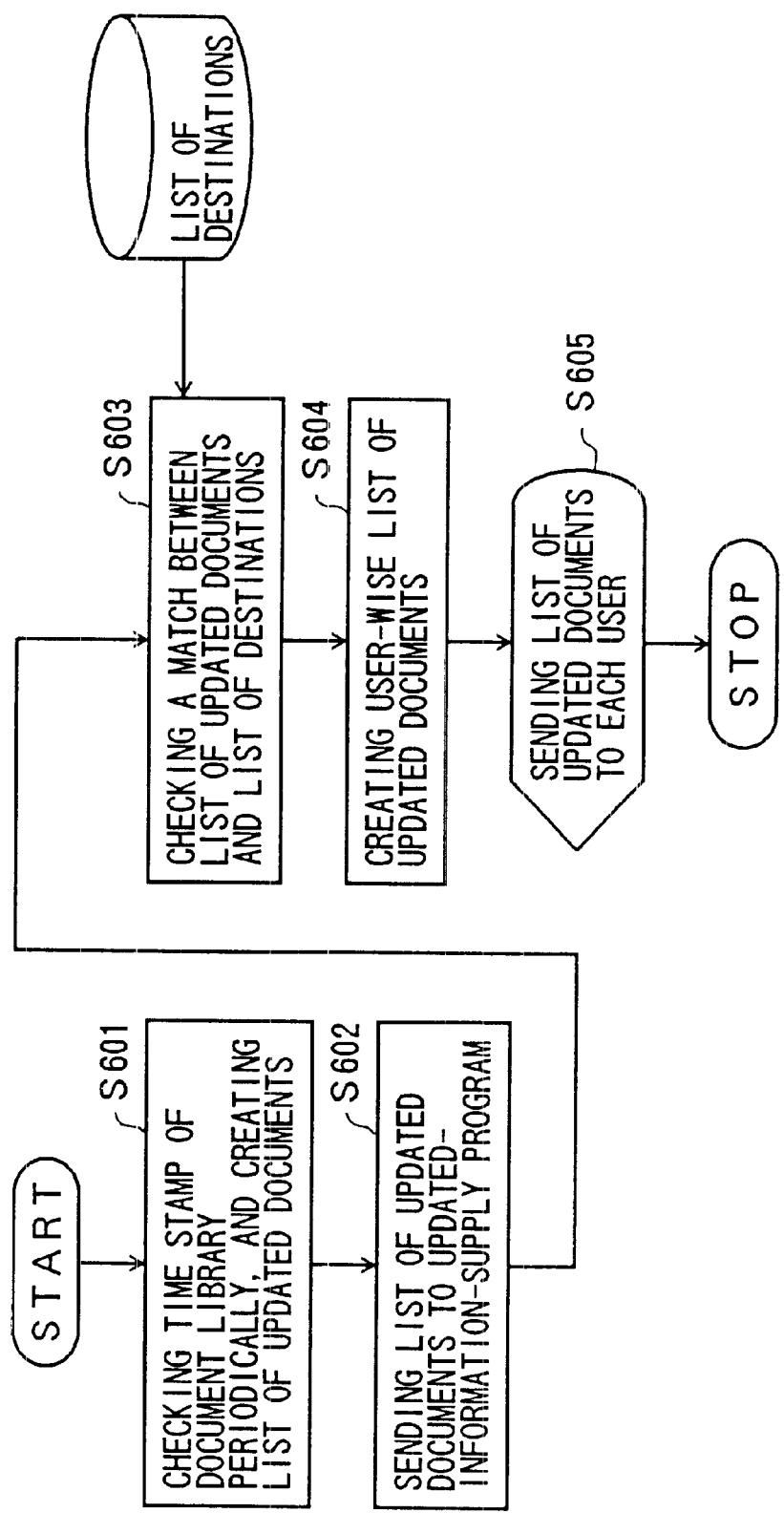

COLLECTING, STORING, AND RETRIEVING KNOWLEDGE WITHIN AN ORGANIZATION

BACKGROUND OF THE INVENTION

1. Field of the Invention

The present invention relates to a method of collecting, storing, and retrieving knowledge and a memory medium storing programs for collecting, storing, and retrieving knowledge, and particularly relates to such a method and a memory medium directed to the collecting, storing, and retrieving of express knowledge utilized in business corporations.

In detail, the present invention relates to such a method of and a memory medium storing programs for registering knowledge in a computerized library and providing retrieved knowledge to one who requested a retrieval of particular knowledge.

2. Description of the Related Art

When there is a need for collecting knowledge such as regarding research and development, marketing, managerial works, or the like, a research and development department, a marketing department, a managerial-work department, or the like collects knowledge by contacting people who have relevant knowledge. Such knowledge may be obtained via a personal interview after an appropriate person to contact is referenced by each responsible department. Alternatively, knowledge may be obtained in a document format after contacting an appropriate source of information to provide such knowledge.

If an appropriate person who was in charge of a relevant work is no longer available because of reassignment, retirement, relocation, etc., record files may be accessed to obtain knowledge.

When collecting information from a computerized library located in a different department, a personal visit may be made to that department to obtain the information. Alternatively, such information stored in a computerized library in a different department may be printed out and faxed over to a department which requested the information.

Knowledge involved in business operations of a corporation is by no means in the possession of each individual as memory-retained personal knowledge. This gives a rise to the following problems:

knowledge of an individual will be lost when this individual leaves because of retirement, relocation, etc.;

it is difficult to find a correct person when others try to obtain relevant knowledge; and even when a correct person is identified, relevant knowledge is not readily obtained if this person is in a remote location such as in a foreign country or taking a long vacation.

Also, a computerized library is usually not managed as a company-wide resource, but each department responsible for its own information manages its own computerized library. This makes it harder for other departments to access a computerized library that belongs to another department. Further, there is a problem in that storing knowledge in a computerized library takes a lengthy time.

Accordingly, there is a need for a method of collecting, storing, and retrieving knowledge and a memory medium storing programs for collecting, storing, and retrieving knowledge, wherein the method and the programs can reduce a manual labor involved in storing knowledge in a computerized library so as to save time and labor, and can make knowledge of each individual readily available to other people which knowledge would be otherwise buried as individual's personal possession.

Further, there is a need for a method of collecting, storing, and retrieving knowledge and a memory medium storing programs for collecting, storing, and retrieving knowledge, wherein the method and the programs can make search based on an agent function with respect to computerized libraries distributed within a corporation, and can allow users to retrieve knowledge without paying attention to a physical location of such knowledge.

Moreover, there is a need for a method of collecting, storing, and retrieving knowledge and a memory medium storing programs for collecting, storing, and retrieving knowledge, wherein the method and the programs can determine attributes of knowledge stored in a computerized library based on characteristic information of the library, and can allow users to retrieve knowledge only relevant to a desired attribute.

Also, there is a need for a method of collecting, storing, and retrieving knowledge and a memory medium storing programs for collecting, storing, and retrieving knowledge, wherein the method and the programs can automatically extract frequently-accessed information, useful information, or the like for use by experts in relevant fields, and can allows such information to be refined into more usable or more accurate information and to be restored in the computerized library.

SUMMARY OF THE INVENTION

Accordingly, it is a general object of the present invention to provide a method of collecting, storing, and retrieving knowledge and a memory medium storing programs for collecting, storing, and retrieving knowledge, wherein the method and the programs can satisfy the needs described above.

It is another and more specific object of the present invention to provide a method of collecting, storing, and retrieving knowledge and a memory medium storing programs for collecting, storing, and retrieving knowledge, wherein the method and the programs can reduce a manual labor involved in storing knowledge in a computerized library so as to save time and labor, and can make knowledge of each individual readily available to other people which knowledge would be otherwise buried as individual's personal possession.

It is yet another object of the present invention to provide a method of collecting, storing, and retrieving knowledge and a memory medium storing programs for collecting, storing, and retrieving knowledge, wherein the method and the programs can make search based on an agent function with respect to computerized libraries distributed within a corporation, and can allow users to retrieve knowledge without paying attention to a physical location of such knowledge.

It is still another object of the present invention to provide a method of collecting, storing, and retrieving knowledge and a memory medium storing programs for collecting, storing, and retrieving knowledge, wherein the method and the programs can determine attributes of knowledge stored in a computerized library based on characteristic information of the library, and can allow users to retrieve knowledge only relevant to a desired attribute.

It is further another object of the present invention to provide a method of collecting, storing, and retrieving knowledge and a memory medium storing programs for collecting, storing, and retrieving knowledge, wherein the method and the programs can automatically extract frequently-accessed information, useful information, or the like for use by experts in relevant fields, and can allows such information to be refined into more usable or more accurate information and to be restored in the computerized library.

In order to achieve the above objects according to the present invention, a method of collecting, storing, and retrieving knowledge includes the steps of collecting knowledge information from information-source terminals via a network, the knowledge information including information regarding research and development, problems, and solutions of the problems, storing the collected knowledge information in libraries by classifying the collected knowledge information based on a type and an attribute of the collected knowledge information, organizing the stored knowledge information based on importance and frequency of use thereof. storing the organized knowledge information in the libraries after standardizing the organized knowledge information so as to be usable by others, and retrieving the standardized knowledge information from a library in response to a retrieval request so as to provide the retrieved information for a requesting party which made the retrieval request.

According to one aspect of the present invention, the method as described above is such that the standardized knowledge information stored in the libraries is grouped according to the type, the attribute, an area, and a group to which the library belongs is identified based on contents of the retrieval request so that the library is subjected to retrieval of information.

According to another aspect of the present invention, the method as described at the top is such that the libraries frequently used by a given one of user groups are recorded by using library IDs, and the library is identified based on the library IDs.

According to another aspect of the present invention, the method as described at the top is such that a history of retrievals is recorded with respect to each one of user groups, and when a plurality of pieces of retrieved information are obtained from a plurality of libraries, the plurality of pieces of retrieved information are ranked according to frequency of retrievals of respective libraries based on the history of retrievals before being provided to the requesting party.

According to another aspect of the present invention, the method as described at the top is such that a history of retrievals is recorded with respect to each one of users, and a summary is stored with respect to each piece of the standardized knowledge information, wherein a summary of the retrieved information is sent to users who frequently retrieve information relating to the retrieved information based on the history of the retrievals.

According to another aspect of the present invention, the method as described at the top is such that a history of retrievals is recorded with respect to each one of users, and the history of retrievals is accessed when the standardized knowledge information is updated, so that updated information or a summary thereof is sent to users who frequently retrieve information relating to the updated standardized knowledge information.

According to another aspect of the present invention, a system for collecting, storing, and retrieving knowledge includes terminals used for registering information and making a first retrieval request via a network, at least one information center including:

a knowledge-information collecting unit which collects knowledge information from the terminals via the network, the knowledge information including information regarding research and development, problems, and solutions of the problems;

a library which stores the collected knowledge information by classifying the collected knowledge information based on a type and an attribute of the collected knowledge information;

an important-information extracting unit which extracts the stored knowledge information based on importance and frequency of use thereof; and a standardizing unit which stores the extracted knowledge information in the library after standardizing the extracted knowledge information so as to be usable by others;

at least one retrieval device which retrieves the standardized knowledge information from the library of a corresponding one of the at least one information center in response to a second retrieval request received via the network, and a retrieval mediating device which selects one of the at least one information center in response to the first retrieval request made by one of the terminals via the network so as to provide the second retrieval request to a corresponding one of the at least one retrieval device, and sends retrieved information obtained from the selected one of the at least one information center to the one of the terminals.

According to another aspect of the present invention, the system as described above is such that the standardized knowledge information stored in the library is grouped according to the type, the attribute, an area, and a group to which the library belongs is identified based on contents of the first retrieval request so that the library is subjected to retrieval of information.

According to another aspect of the present invention, the system as first described is such that the retrieval mediating device defines user groups, and records libraries frequently used by a given one of the user groups by using library IDs, and selects a library to be subjected to retrieval of information based on the library IDs.

According to another aspect of the present invention, the system as first described is such that the retrieval mediating device records a history of retrievals with respect to each one of user groups, and when a plurality of pieces of retrieved information are obtained from a plurality of libraries, the retrieval mediating device ranks the plurality of pieces of retrieved information according to frequency of retrievals of respective libraries based on the history of retrievals before providing the plurality of pieces of retrieved information to a requesting terminal.

According to another aspect of the present invention, the system as first described is such that the at least one information center further generates and stores a summary with respect to a corresponding piece of the standardized knowledge information, and the retrieval mediating device records a history of retrievals with respect to each one of users, and, based on the history of retrievals, sends the summary of the retrieved information to users who frequently retrieve information relating to the retrieved information.

According to another aspect of the present invention, the system as first described is such that the retrieval mediating device records a history of retrievals with respect to each one of users, and accesses the history of retrievals when the standardized knowledge information is updated in the library, so as to send updated information or a summary thereof to users who frequently retrieve information relating to the updated standardized knowledge information.

According to another aspect of the present invention, a computer-readable medium having programs embodied therein for collecting, storing, and retrieving knowledge includes knowledge-information collecting means for causing an information center to collect knowledge information, the knowledge information including information regarding research and development, problems, and solutions of the problems, knowledge-information-storage means for causing the information center to store the collected knowledge information in a library by classifying the collected knowledge information based on a type and an attribute of the collected knowledge information, important-information extracting means for causing the information center to extract the stored knowledge information from the library based on importance and frequency of use thereof, standardizing means for causing the information center to store the extracted knowledge information in the library after standardizing the extracted knowledge information so as to be usable by others, retrieval means for causing a retrieval device to retrieve the standardized knowledge information from the library of a corresponding one of information centers in response to a first retrieval request received via the network, retrieval requesting means for causing a retrieval mediating device to select one of the information centers in response to a second retrieval request received via the network, and to provide the first retrieval request to a corresponding one of retrieval devices, and retrieved-information transmitting means for causing the retrieval mediating device to send retrieved information obtained from the selected one of the information centers to a requesting terminal which made the second retrieval request.

According to the present invention, the collected knowledge information is stored in accordance with classifications defined based on attributes and types of the collected knowledge information, so that individuals of each department can merely submit the knowledge without paying attention to formats being used with regard to the submitted knowledge. Extraction and refinement of useful and/or frequently used information among the collected knowledge information makes it possible to store the standardized knowledge information having a commercial value. When an access is made to the standardized knowledge information, therefore, fees can be charged for the use of the knowledge. Further, when a retrieval is made with respect to the standardized knowledge information, a user does not have to know the physical location of the device where relevant information is stored.

Since time and labor required for registering knowledge in the computerized library are reduced, personal knowledge which would otherwise be buried is encouraged to be provided for use by others. Further, useful and frequently used information is automatically extracted and presented to experts, thereby allowing the experts to refine the information into more accurate one and store the refined information in the computerized library. This facilitates distribution of knowledge, and enhances quality of knowledge within the organization. When new knowledge information is collected, the administrator may issue a message for selecting an expert in charge of the new knowledge information, thereby deciding the expert in charge.

When information is to be retrieved, the computerized libraries distributed within the organization are subjected to search based on agent functions, so that users do not have to know the physical locations of relevant knowledge. Further, a search can be made only with respect to knowledge information having appropriate attributes matching the need of the users. Such a selective search can be achieved by using characteristic information of the libraries to identify attributes of the stored knowledge information. This achieves more efficient and more accurate retrieval of desired information.

Further, a group to which a relevant library belongs is identified when a retrieval request is made, and, thus, a search is made with respect to the library. In this manner, users do not have to pay attention to the physical location where relevant knowledge information is stored.

Moreover, user groups are defined with respect to each organizational unit such as a department, and frequently used libraries are recorded on a user-group-wise basis. By specifying a name of a library at the time of making a retrieval request, this library can be given the highest priority when searching relevant information, thereby reducing a time for the search.

Also, when a plurality of pieces of retrieved information are obtained from a plurality of libraries, the plurality of pieces of retrieved information are ranked according to frequency of use of the libraries based on a history of retrievals, and are sent to terminals along with the accorded ranks when the terminals made a retrieval request. This makes it possible to present the retrieved information in a descending order of likelihood of usefulness, thereby reducing a time which the users need to identify the most desired information.

Further, users who are likely to retrieve information relating to the retrieved information are provided with a summary of the retrieved information. This is done based on a history of retrievals recorded with respect to each user, and makes it possible to supply the summary to the users who are likely to take interest in the retrieved information. Since only the summary is transmitted, the amount of transmitted information is small. Also, only the users who need this particular knowledge information make access, excess traffic can be avoided.

Moreover, when the standardized knowledge information stored in the library is updated, the updated information or the summary thereof is sent to users who have frequently accessed the standardized knowledge information or information relating to the standardized knowledge information. Such users are identified based on a history of retrievals recorded with respect to each user. In this manner, the users are kept posted of the most updated information.

Other objects and further features of the present invention will be apparent from the following detailed description when read in conjunction with the accompanying drawings.

BRIEF DESCRIPTION OF THE DRAWINGS

FIG. 4 is an illustrative drawing showing an exemplary layout of a storage-structure-definition file according to the embodiment of the present invention;

FIG. 7 is an illustrative drawing showing a configuration regarding knowledge-retrieval operations according to the embodiment of the present invention;

FIGS. 8A through 8C are table charts showing a configuration of a group-information table;

FIG. 9 is a table chart showing a configuration of a group-check knowledge-base;

FIG. 10 is a table chart showing a configuration of a user-group-wise document-use-history table;

FIG. 13 is a table chart showing a layout of a keyword-use-information file according to the embodiment of the present invention;

FIGS. 14A through 14C are table charts showing a layout of a document-use-information file according to the embodiment of the present invention;

FIGS. 16–17 is an illustrative drawing for explaining operations of the retrieval mediating device when the retrieval mediating device sends updated information according to the embodiment of the present invention.

DESCRIPTION OF THE PREFERRED EMBODIMENTS

In the following, an embodiment of the present invention will be described with reference to the accompanying drawings.

Figure 1:
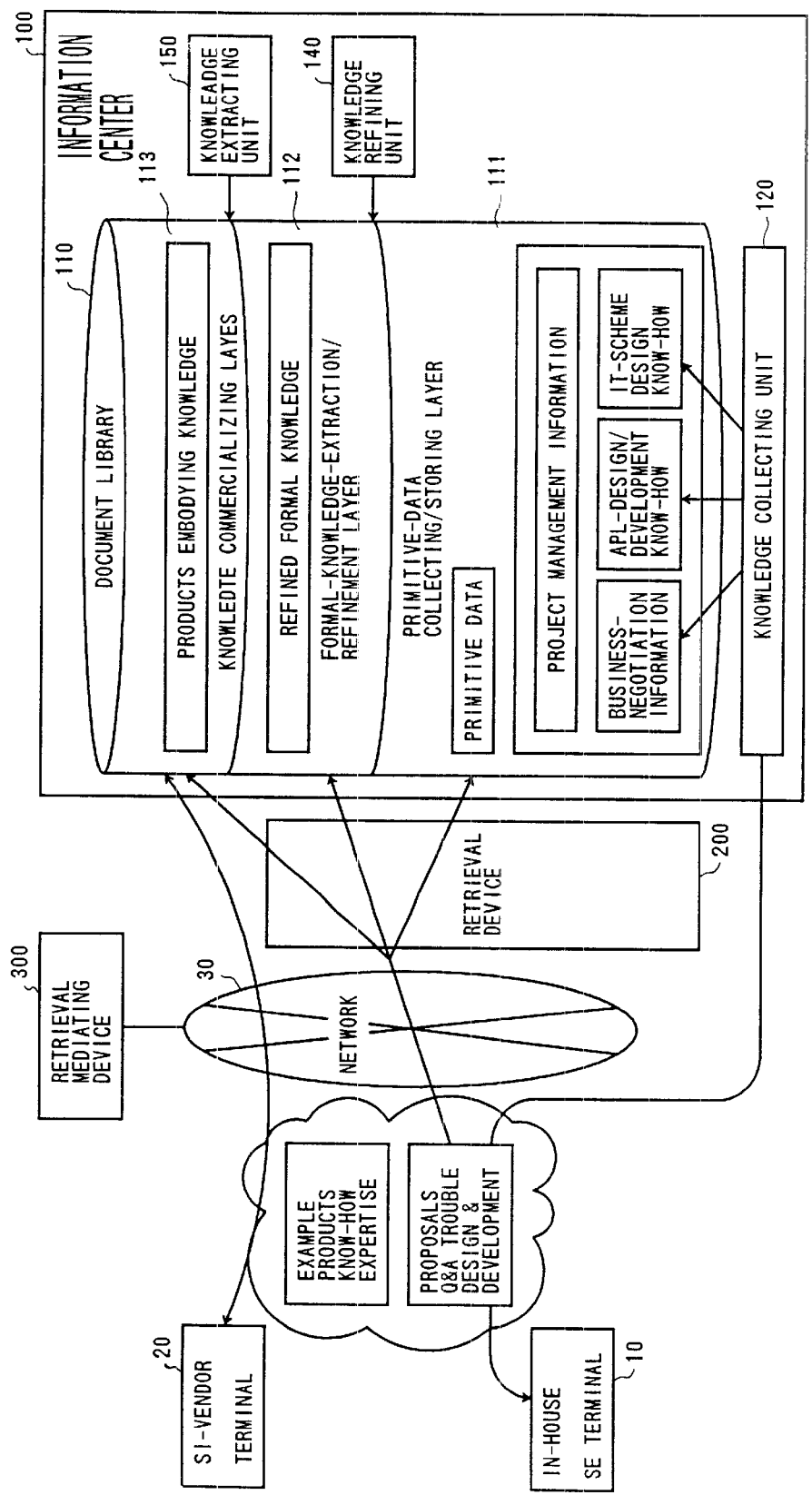
FIG. 1 is an illustrative drawing showing a system configuration of the present invention.

FIG. 1 is an illustrative drawing showing a system configuration of the present invention.

The system of FIG. 1 includes an in-house SE terminal 10, an SI-vendor terminal 20, a network 30, a center 100, a plurality of retrieval devices 200, and a retrieval mediating device 300.

The center 100 includes a document library 110, a knowledge collecting unit 120, a knowledge refining unit 140, and a knowledge extracting unit 150.

The document library 110 includes a primitive-data collecting/storing layer 111, a formal-knowledge-extraction/refinement layer 112, and a knowledge commercializing layer 113.

The knowledge collecting unit 120 collects project-management information, business-negotiation information, know-hows regarding application design and development, know-hows regarding an IT-scheme design, etc., via the network when such information and know-hows are developed by in-house SEs. The knowledge collecting unit 120 then stores the information and know-hows in the primitive-data collecting/storing layer 111 of the document library 110 by using a storage-structure-definition file (not shown). When using the storage-structure-definition file, attributes and types of knowledge information are obtained from each SE, and a reference to the storage-structure-definition file is made based on these attributes and types.

The knowledge refining unit 140 refines primitive data stored in the primitive-data collecting/storing layer 111 of the document library 110, and stores refined data in the formal-knowledge-extraction/refinement layer 112. In detail, the knowledge refining unit 140 is equipped with a function to present the primitive data to experts, and, then, the experts select frequently-accessed information and useful information from the primitive data, subsequently refining the same into more usable form or more accurate information. The refined information is thereafter stored in the formal-knowledge-extraction/refinement layer 112.

The knowledge extracting unit 150 extracts knowledge from the formal-knowledge-extraction/refinement layer 112 of the document library 110 when the knowledge is able to be commercialized. The extracted information is stored in the knowledge commercializing layer 113 of the document library 110.

The retrieval devices 200 are connected to the network 30, and receives a request from the in-house SE terminal 10 or the SI-vendor terminal 20 via the retrieval mediating device 300, such a request being made for retrieving know-hows of products, information regarding ideas, questions, and troubles, information on design and development. The retrieval device 200 then searches the document library 110 of the center 100 which stores data relating the requested information, and returns the requested information to the in-house SE terminal 10 or the SI-vendor terminal 20.

The retrieval mediating device 300, upon receiving the retrieval request from the in-house SE terminal 10 or the SI-vendor terminal 20, selects a retrieval device 200 from the plurality of retrieval devices 200 such that the document library 110 connected to the selected retrieval device 200 is likely to have information relevant to the retrieval request. The retrieval mediating device 300 then request the selected retrieval device 200 to make a search. Further, the retrieval mediating device 300 serves to send the retrieved information to the in-house SE terminal 10 or the SI-vendor terminal 20. The retrieval mediating device 300 also obtains from the retrieval device 200 a summary of the knowledge stored in the document library 110 or renewed information when the document library 110 is updated, and sends the obtained summary or the renewed information to the in-house SE terminal 10 or the SI-vendor terminal 20.

In what follows, the knowledge collecting unit 120 will be described with regard to the operations thereof.

Figure 2:
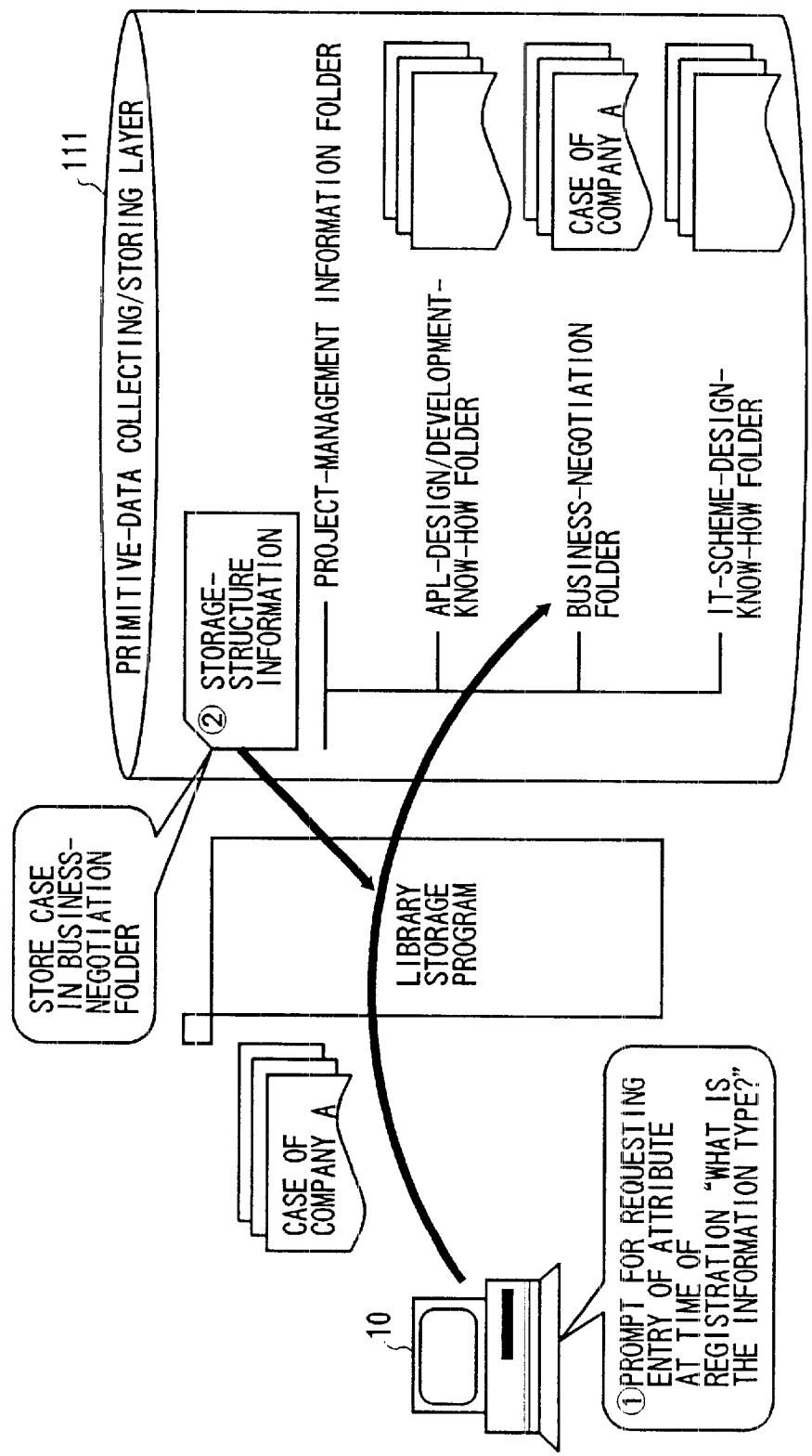
FIG. 2 is an illustrative drawing for explaining operations of a knowledge collecting unit of FIG. 1 according to an embodiment of the present invention.

FIG. 2 is an illustrative drawing for explaining operations of the knowledge collecting unit 120 according to an embodiment of the present invention.

The primitive-data collecting/storing layer 111 of the document library 110 includes management-information folders, application-design/development-know-how folders, business-negotiation folders, and IT-scheme-design-know-how folders, for example.

Storage-structure information about the primitive-data collecting/storing layer 111 is provided in library-storage programs of the knowledge collecting unit 120. When the library-storage programs obtain a case on company A from the in-house SE terminal 10, information tag for identifying the types and attributes of the case is attached to the information. The information is then stored in a corresponding folder which provides a match for the information tag in the primitive-data collecting/storing layer 111. In this example, the case on the company A is stored in a business-negotiation folder.

Figure 3:
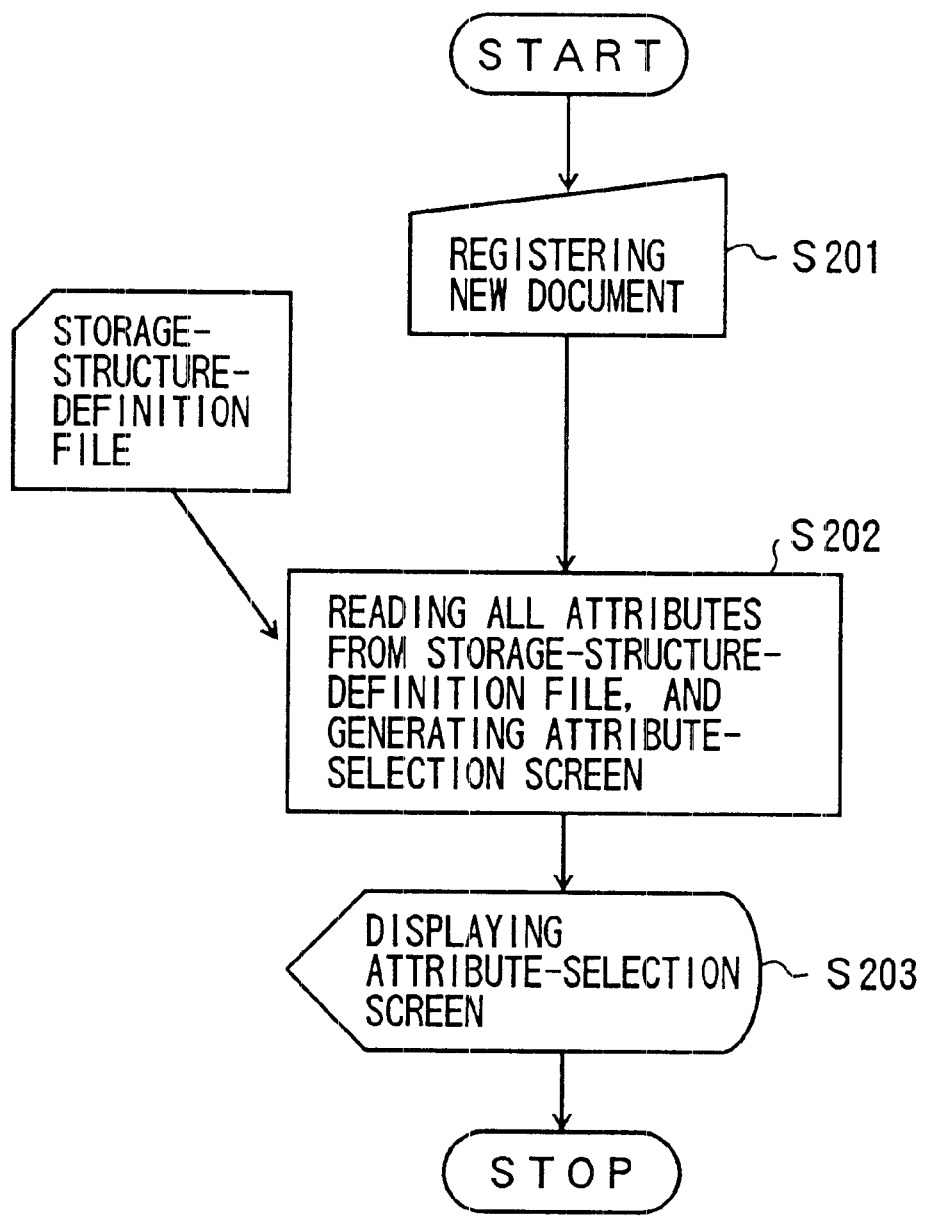
FIG. 3 is a flowchart of a method of registering information according to the embodiment of the present invention.

FIG. 3 is a flowchart of a method of registering information according to the embodiment of the present invention. FIG. 4 is an illustrative drawing showing an exemplary layout of the storage-structure-definition file according to the embodiment of the present invention.

At a step S201, the knowledge collecting unit 120 is notified by the in-house SE terminal 10 that a process to register a new document is started.

Figure 5:
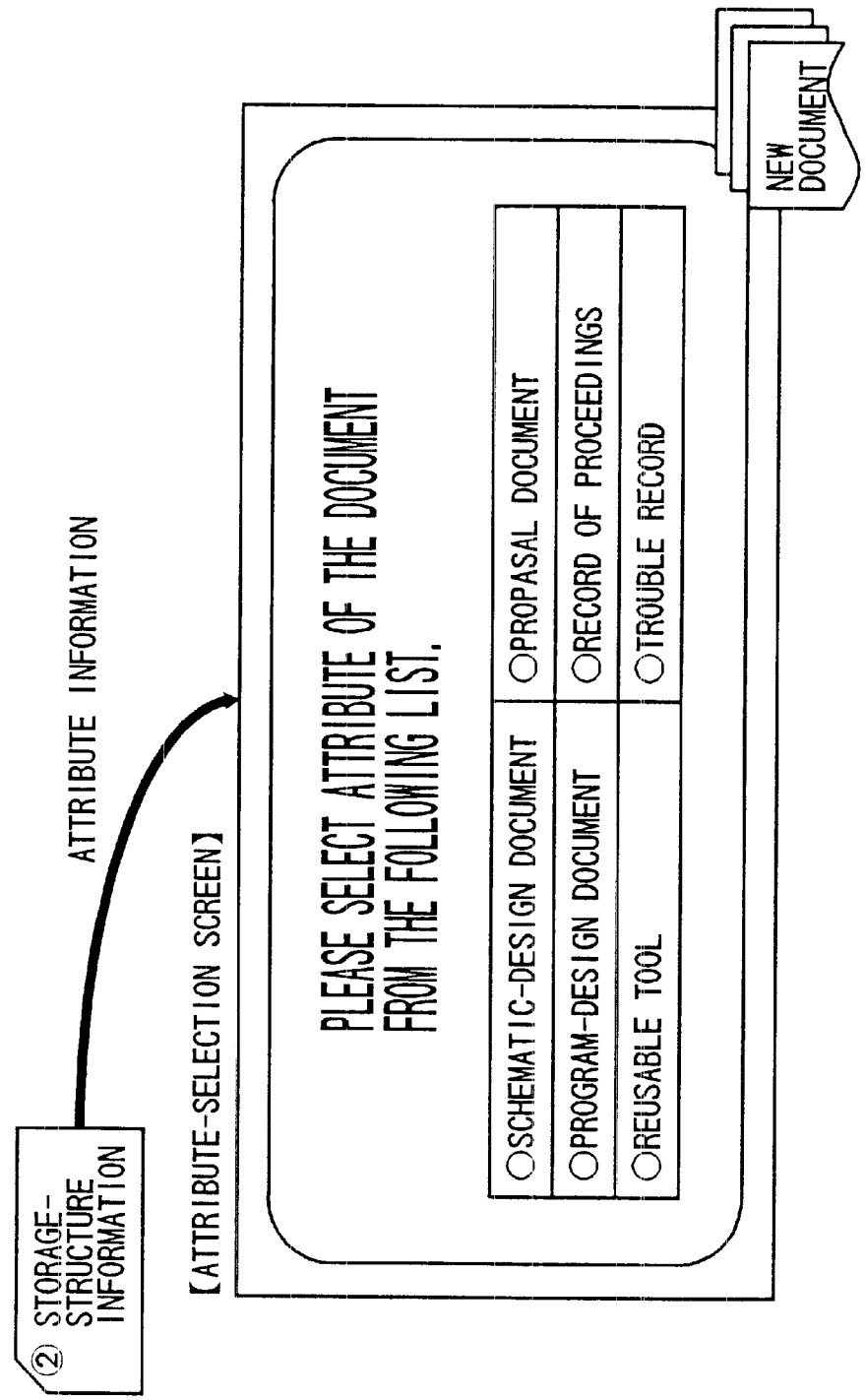
FIG. 5 is an illustrative drawing showing an example of an attribute-selection screen created by the knowledge collecting unit.

At a step S202, the knowledge collecting unit 120 reads all items of document attributes from the storage-structure-definition file shown in FIG. 4, and creates an attribute-selection screen. FIG. 5 is an illustrative drawing showing an example of an attribute-selection screen created by the knowledge collecting unit 120.

At a step S203, the attribute-selection screen created at the step S202 is displayed.

When one of the attributes needs to be selected for registration of the information, the library-storage programs of the knowledge collecting unit 120 requests selection of one of the attributes by displaying the attribute-selection screen of FIG. 5 on the in-house SE terminal 10 after referring to the storage-structure-definition file. An input is made to select one of the attributes on the display of the in-house SE terminal 10, so that the new document is registered at a storage location determined based on the selected attribute.

In the following, operations of the library-storage programs of the knowledge collecting unit 120 will be described.

Figure 6:
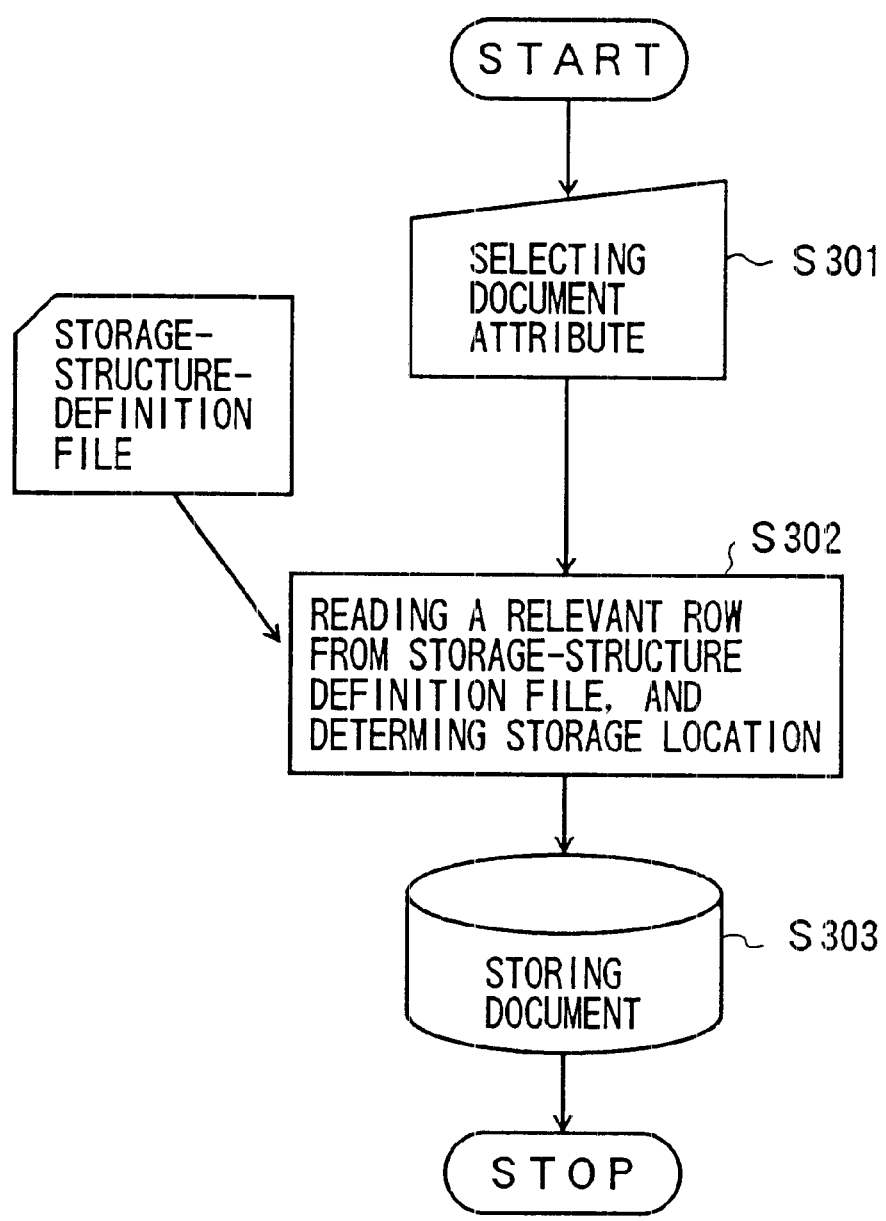
FIG. 6 is a flowchart of a method of determining a storage location of information according to the embodiment of the present invention.

FIG. 6 is a flowchart of a method of determining a storage location of information according to the embodiment of the present invention. This method is specified in the library-storage programs.

At a step S301, an attribute of a document to be registered is selected at the in-house SE terminal 10.

At a step S302, the library-storage programs of the knowledge collecting unit 120 access the storage-structure-definition file, and read a row corresponding to the selected attribute as shown in FIG. 4, thereby determining a storage location for storing the document in the document library 110.

At a step S303, the document (information to be registered) is stored in the document library 110 at the storage location determined as in the above.

In this manner, the library-storage programs of the knowledge collecting unit 120 refer to the storage-structure-definition file by using the selected attribute as a key, and determine a storage location within the primitive-data collecting/storing layer 111 of the document library 110. The attributes among which one is selected for determining the storage location as described above are defined by an SE on a document-attribute-information-definition screen at the time of initial registration.

In what follows, operations of the retrieval device 200 will be described.

FIG. 7 is an illustrative drawing showing a configuration regarding knowledge-retrieval operations according to the embodiment of the present invention.

A configuration of FIG. 7 includes the retrieval mediating device 300, a user-group-wise document-use-history table 310, a group-check knowledge-base 320, a group-information table 330, and a plurality of retrieval devices 200.

The retrieval mediating device 300 receives a retrieval request from the in-house SE terminal 10 or the SI-vendor terminal 20, and selects a retrieval device 200 to which the retrieval request is made by referring to the group-check knowledge-base 320 and the group-information table 330.

FIGS. 8A through 8C are table charts showing a configuration of the group-information table 330.

The group-information table 330 includes a area/job-description group, an information-classification group, and a work-procedure group. The area/job-description group includes such items as a name of a retrieval device, an area, a job description, a content key, a time stamp, etc. The information-classification group includes a name of a retrieval device, attribute information, etc. The work-procedure group includes a name of a retrieval device, a work procedure, attribute information, etc.

FIG. 9 is a table chart showing a configuration of the group-check knowledge-base 320.

The group-check knowledge-base 320 includes a user ID, a date, retrieval keywords, a document-library ID, and a document ID.

The retrieval mediating device 300, upon receiving a retrieval request from the in-house SE terminal 10 or the SI-vendor terminal 20, refers to the group-check knowledge-base 320, and selects a group based on retrieval keys contained in the retrieval request. The retrieval mediating device 300 then searches the group-information table 330, thereby determining an appropriate retrieval device 200.

After obtaining retrieved information from the retrieval device 200, the retrieval mediating device 300 search the user-group-wise document-use-history table 310. FIG. 10 is a table chart showing a configuration of the user-group-wise document-use-history table 310.

By searching the user-group-wise document-use-history table 310, the retrieval mediating device 300 finds a user group taking the same interest as the user who requested the retrieval, and ranks the retrieved information relative to other retrieved information obtained from the plurality of retrieval devices 200. The user-group-wise document-use-history table 310 includes a user-group ID, a document-library ID, a document ID, and frequency of use. The document ID of the user-group-wise document-use-history table 310 is a record of IDs of documents which are frequently referenced by a given user group. The user-group ID is used for specifying an organizational unit such as a department, a division, and a team, or an expert group in a particular technological art. Such information as the document-library ID and the document ID is often used in organizations. The frequency of use serves to provide a measure for checking the degree to which given information is usable in a given organization. Information frequently used in a given organization such as a department, a division, or a team is regarded as highly usable in this particular organization. Further, information frequently used in an expert group can be regarded as highly reliable and valuable because of the credibility that is usually associated to the experts of the group, and this is the reason why expert groups are used for determining a ranking of the information.

Figure 11:
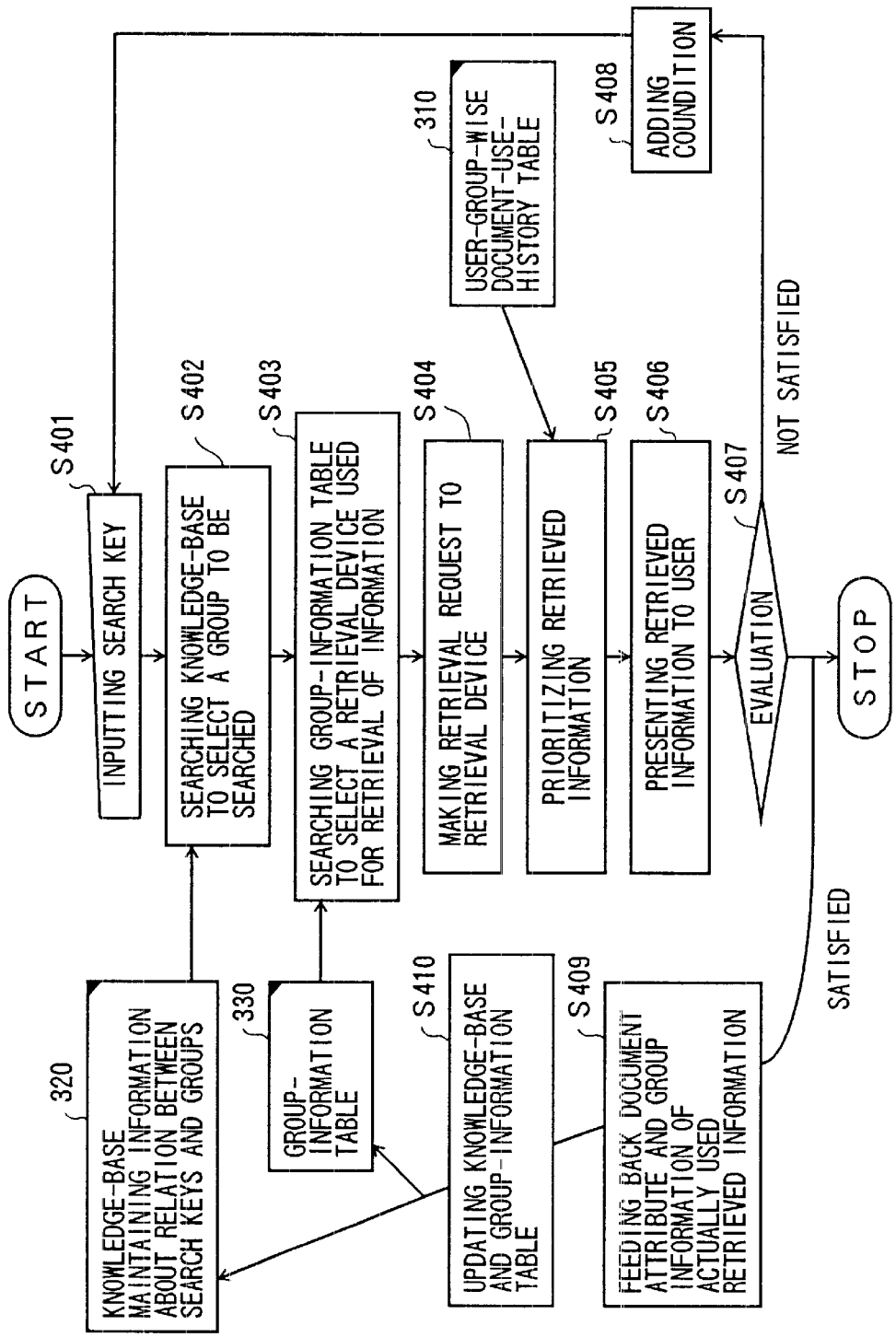
FIG. 11 is a flowchart of a method of retrieving knowledge according to the embodiment of the present invention.

FIG. 11 is a flowchart of a method of retrieving knowledge according to the embodiment of the present invention.

At a step S401, retrieval keys are entered at the in-house SE terminal 10 or the SI-vendor terminal 20.

At a step S402, the retrieval mediating device 300 searches the group-check knowledge-base 320 which maintains information on retrieval keys and groups, thereby selecting an appropriate group.

At a step S403, the retrieval mediating device 300 searches the group-information table 330 by using the information (i.e., information about an area, a job description, an information classification, a task item, etc.) obtained from the group-check knowledge-base 320, and selects an appropriate retrieval device 200 which is to be used for retrieval of information.

At a step S404, a retrieval request is made to the selected retrieval device 200.

At a step S405, the retrieval mediating device 300 refers to the user-group-wise document-use-history table 310 based on retrieved information obtained from the retrieval device 200, and prioritize the retrieved information.

At a step S406, the retrieval mediating device 300 present the retrieved information to the user along with the ranking of the retrieved information.

At a step S407, the user evaluate the retrieved information displayed at the in-house SE terminal 10 or the SI-vendor terminal 20. If the user is not satisfied with the retrieved information, the procedure goes to a step S408. If the user is satisfied, the procedure goes to a step S409.

At the step S408, retrieval conditions are added, and the procedure goes back to the step S401.

At the step S409, an attribute and group information of the retrieved document which is actually used by the user is fed back to the group-check knowledge-base 320 and the group-information table 330.

At a step S410, the group-check knowledge-base 320 and the group-information table 330 are updated.

In the following, the knowledge refining unit 140 and the knowledge extracting unit 150 of the center 100 will be described in detail.

The knowledge refining unit 140 selects useful information in order to make reuse of primitive data stored in the primitive-data collecting/storing layer 111, and refines the selected information to store the refined information in the formal-knowledge-extraction/refinement layer 112.

The knowledge extracting unit 150 obtains information regarding reuse of knowledge from the refined information which is stored in the formal-knowledge-extraction/refinement layer 112 by the knowledge refining unit 140, and selects/extracts information useful for commercialization. The selected information is then stored in the knowledge commercializing layer 113. The information stored in the knowledge commercializing layer 113 includes:

- a summary of a document;
- a combination of keywords used for retrieval and a document retrieved by the keywords;
- the number of downloading with respect to each document;
- evaluation made by the user when an outline of the document is presented to the user; and
- information on a document frequently used by a particular user group.

The information stored in the knowledge commercializing layer 113 by the knowledge extracting unit 150 is searched for by the retrieval device 200, and is transmitted to the retrieval mediating device 300. In this manner, the retrieval mediating device 300 provides the information for the in-house SE terminal 10 or the SI-vendor terminal 20 which made a retrieval request. Further, the retrieval mediating device 300 automatically sends a summary of the information to users who frequently uses relating information.

When a document stored in the knowledge commercializing layer 113 is updated, the retrieval mediating device 300 notifies the in-house SE terminal 10 and the SI-vendor terminal 20 of the updated information if these terminals have ever requested the pertinent document.

Figure 12:
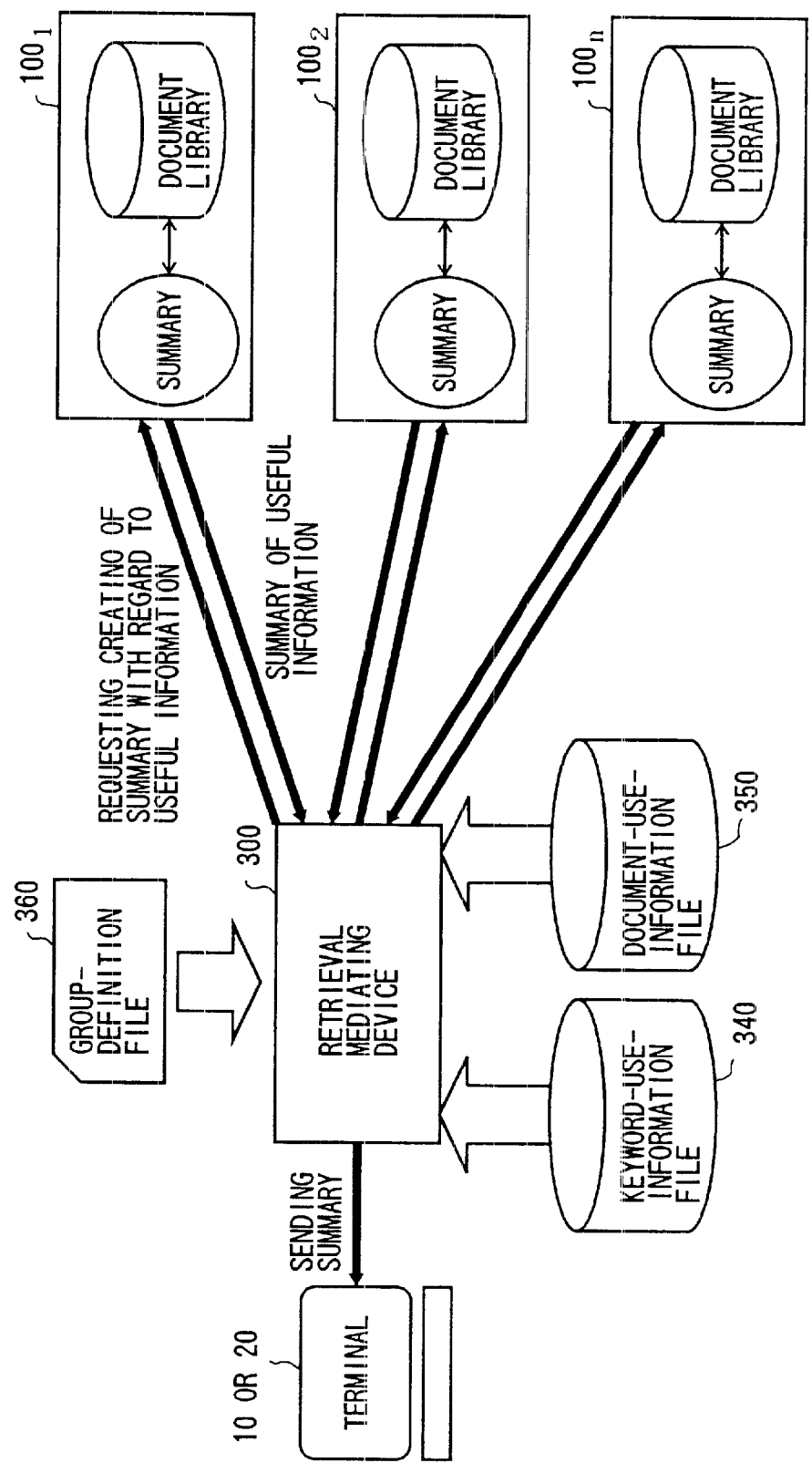
FIG. 12 is an illustrative drawing for explaining operations for providing retrieved information performed by a retrieval mediating device according to the present invention.

FIG. 12 is an illustrative drawing for explaining operations for providing retrieved information performed by the retrieval mediating device according to the present invention.

The retrieval mediating device 300 refers to a keyword-use-information file 340, a document-use-information file 350, and a group-definition file 360, and sends knowledge information obtained from the retrieval device 200 to the SI-vendor terminal 20 or the SI-vendor terminal 20 which requested retrieval of information. When obtaining a summary of the knowledge from the retrieval device 200, the retrieval mediating device 300 sends the summary to the in-house SE terminal 10 and/or the SI-vendor terminal 20 which have ever acquired relating information. The in-house SE terminal 10 and/or the SI-vendor terminal 20 refer to the summary. When a request for retrieving detailed knowledge is made, the retrieval device 200 obtains the detailed information from the knowledge commercializing layer 113 of the document library 110, and sends the same to the requesting party. Details of this operation will be described later.

Figure 13:
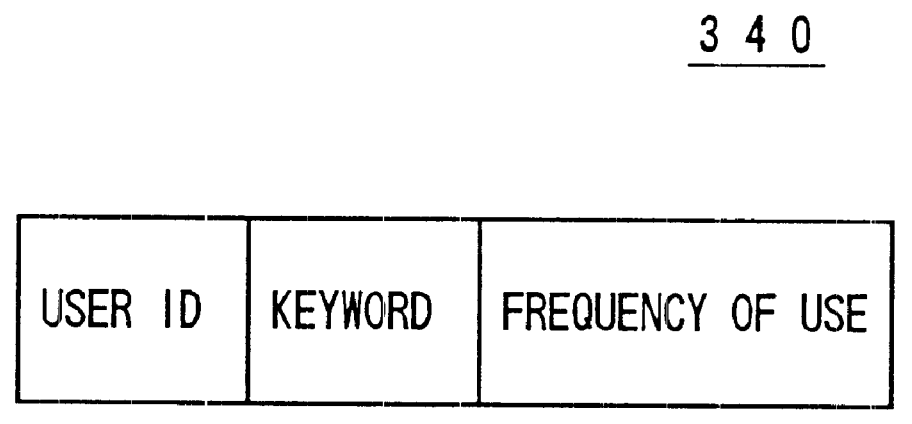

FIG. 13 is a table chart showing a layout of the keyword-use-information file according to the embodiment of the present invention.

As shown in the figure, the keyword-use-information file 340 includes a user ID, a keyword, and frequency of use.

FIGS. 14A through 14C are table charts showing a layout of the document-use-information file according to the embodiment of the present invention.

The document-use-information file 350 includes a document-and-keyword table, a document-and-evaluation table, and a download-frequency table. The document-and-keyword table is comprised of a document-library ID, a document ID, and a keyword list. The document-and-evaluation table is comprised of a document-library ID, a document ID, and evaluation information (evaluation 1, evaluation 2, and evaluation 3). Further, the download-frequency table includes a document-library-ID, a document ID, and download frequency.

Figure 15:
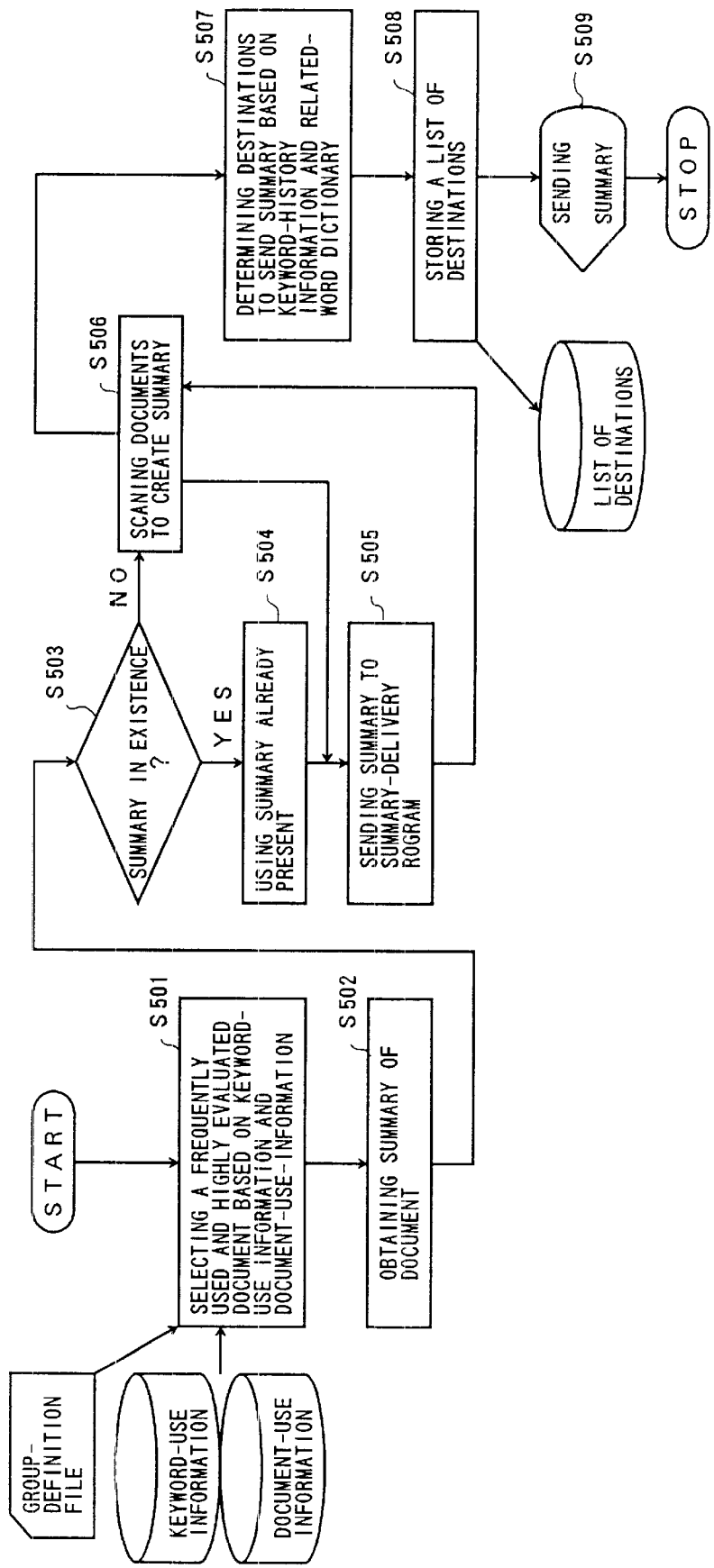
FIG. 15 is a flowchart of a method of sending a summary performed by the retrieval mediating device according to the embodiment of the present invention.

FIG. 15 is a flowchart of a method of sending a summary performed by the retrieval mediating device 300 according to the embodiment of the present invention.

At a step S501, an extraction program of the retrieval mediating device 300 selects a document by using the keyword-use-information file 340 and the document-use-information file 350 such that the selected document is of frequent use and highly evaluated.

At a step S502, a summary of the selected document is obtained with respect to the knowledge extracting unit 150 of each center 100.

At a step S503, a check is made as to whether the summary is already stored in the knowledge commercializing layer 113. If it is, the procedure goes to a step S504. Otherwise, the procedure goes to a step S505.

At the step S504, since the summary is already in the knowledge commercializing layer 113, the summary is obtained from the knowledge commercializing layer 113 via the retrieval device 200.

At the step S505, since the summary is non-exsistent in the knowledge commercializing layer 113, a request is made to the knowledge extracting unit 150 of the center 100 via the retrieval device 200. The summary is thus obtained.

At a step S506, destinations to send the summary are determined based on the keyword-history information and a related-word dictionary (not shown) maintained on the user-wise basis.

At a step S507, a list of the determined destinations is generated and kept in a storage.

At a step S508, the summary is send to the determined destinations.

If a request for detailed information with respect to the summary is thereafter made by a given one of the destinations, the retrieval mediating device 300 requests the detailed information via the retrieval device 200, and sends the detailed information, when obtained, to the given one of the destinations.

The retrieval mediating device 300 is further equipped with a function to notify users of the contents of the knowledge commercializing layer 113 updated in the center 100 if the users have ever requested retrieval of the relevant information.

In the above example, a description has been given with regard to provision of a summary. In addition, however, the retrieval mediating device 300 is equipped with a function to send the retrieved information supplied from the retrieval device 200 to a party which requested the retrieval of the information.

Figure 16:
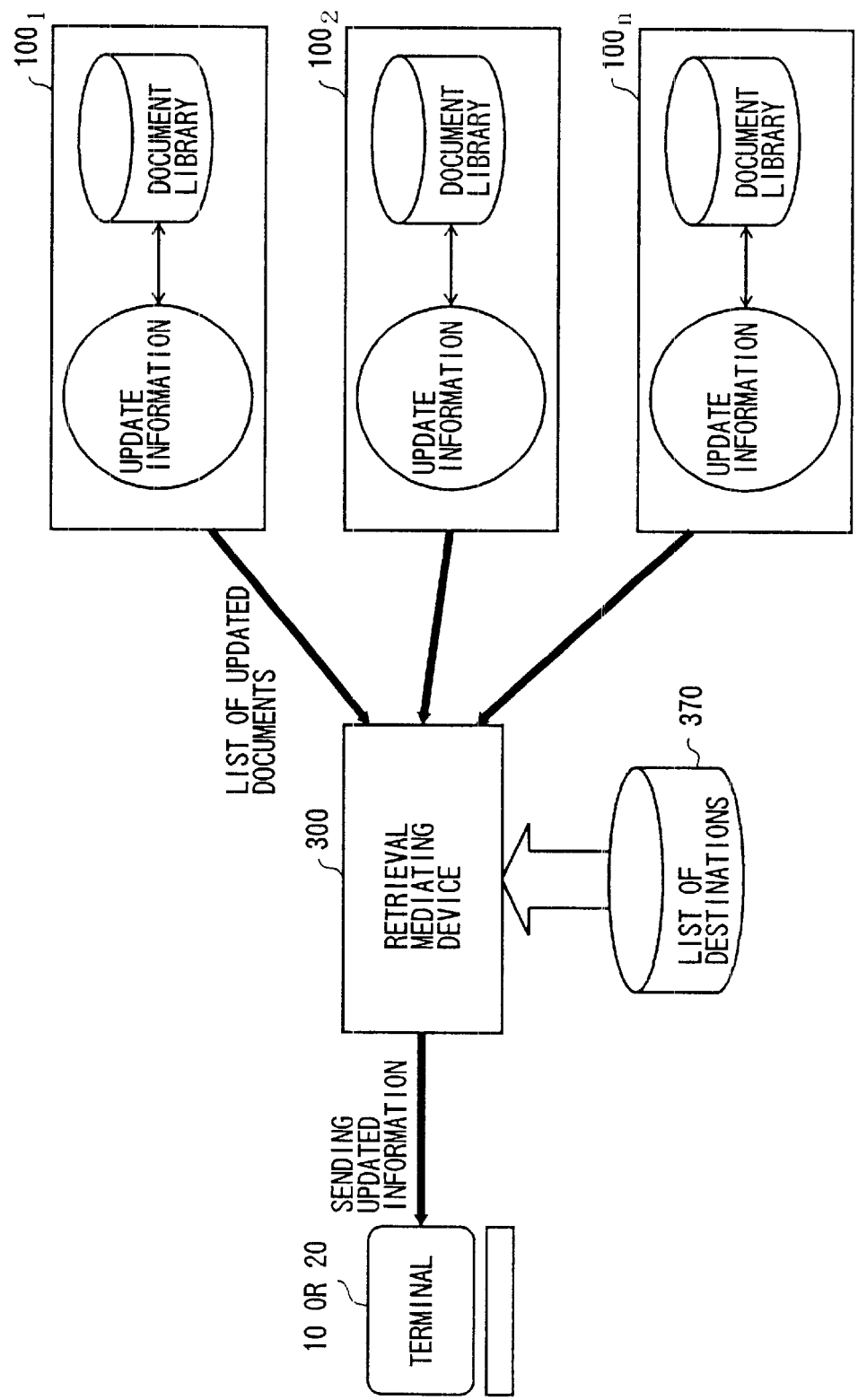

FIG. 16 is an illustrative drawing for explaining operations of the retrieval mediating device 300 when the retrieval mediating device 300 sends updated information according to the embodiment of the present invention.

The retrieval mediating device 300 executes an updated-information-supply program, which obtains updated information from each center 100 when information is updated in the knowledge commercializing layer 113 of the document library 110. The retrieval mediating device 300 then sends out the updated information based on a destination list 370.

FIG. 17 is a flowchart of a method of sending updated information performed by the retrieval mediating device 300 according to the embodiment of the present invention.

At a step S601, a time stamp of the knowledge commercializing layer 113 of the document library 110 is periodically checked with respect to each center 100, thereby creating a list of documents which were updated after the last processing.

At a step S602, the list of updated documents is send to the updated-information-supply program of the retrieval mediating device 300 via the retrieval device 200.

At a step S603, the updated-information-supply program of the retrieval mediating device 300 checks a match between the list of updated documents and the list of destinations.

At a step S604, a user-wise list of updated documents is created.

At a step S605, the user-wise list of updated documents is send to each respective user.

In this manner, according to the embodiment of the present invention, in-house SEs or other SI vendors send information about products, know-hows, and various technologies, proposals, questions, issues regarding troubles and solutions thereof, and the contents of every-day activities regarding design and development to the center 100 via the network 30 in such a manner that every transmitted item is provided with attributes and types of information. The center 100, upon receiving the knowledge, stores the knowledge in the document library 110. Then, other SEs, vendors, and users can retrieve information stored in the document library 110 by simply submitting a retrieval request to the retrieval mediating device 300. This makes it possible to retrieve information without a need for the users to be conscious of the physical locations of the document libraries which contain knowledge relating to activities of other departments or organizations.

Upon receiving the retrieving request from the in-house SE terminal 10 or the SI-vendor terminal 20, the retrieval mediating device 300 analyzes the retrieval request. The retrieval mediating device 300 then refers to keywords, a user group, a retrieval history, etc., included in the retrieval request, and transmits a retrieval request to the retrieval device 200 which can access the document library containing relevant knowledge information. In response to the retrieval request, the retrieval device 200 transmits retrieved information obtained in accordance with the keywords of the retrieved request to the retrieval mediating device 300. According to the series of operations described above, the SEs readily obtain knowledge information developed by other departments by simply transmitting keywords relating to desired information, and there is no need for the SEs to engage in a search operation themselves to look through a variety of knowledge information.

The present invention can be implemented as software programs defining each operation described above.

Programs for achieving the operations of the retrieval mediating device 300, for example, include a retrieval-request mediating program for making a retrieval request to a retrieval device, an information-supply program for supplying retrieved information and/or a summary to a terminal, an updated-information-supply program for supplying information updated in the library, etc.

Programs for implementing functions of the retrieval device 200 include a retrieval program which searches the document library 110 of the center 100 in response to a retrieval request sent from the retrieval mediating device 300.

Programs for implementing the operations of the center 100 include a collection program for collecting knowledge information from the in-house SE terminal 10 and/or the SI-vendor terminal 20, a library-storage program for storing collected information in the document library 110, a refinement program for refining knowledge information stored in the document library 110, an extraction program for extracting knowledge information which can be commercialized among pieces of refined knowledge information.

These programs are stored in disk drives connected to respective devices, and installed when the present invention is used. When the present invention is employed in corporations, the programs may be stored in portable memory media such as floppy disks or CD-ROMs, and are installed in computers when it is necessary.

Further, the present invention is not limited to these embodiments, but various variations and modifications may be made without departing from the scope of the present invention.

What is claimed is:

1. A method of collecting, storing, and retrieving knowledge, comprising:

collecting knowledge information from information-source terminals via a network, the knowledge information including information regarding research and development, problems, and solutions of the problems;

storing the collected knowledge information in libraries by classifying the collected knowledge information based on a type and an attribute of the collected knowledge information;

organizing the stored knowledge information based on importance and frequency of use thereof;

storing the organized knowledge information in the libraries after standardizing the organized knowledge information so as to be usable by others; and retrieving the standardized knowledge information from a library in response to a retrieval request so as to provide the retrieved information for a requesting party which made the retrieval request.

2. The method as claimed in claim 1, wherein the standardized knowledge information stored in the libraries is grouped according to the type, the attribute, an area, and a group to which the library belongs is identified based on contents of the retrieval request so that the library is subjected to retrieval of information.

3. The method as claimed in claim 1, wherein the libraries frequently used by a given one of user groups are recorded by using library IDs, and the library is identified based on the library IDs.

4. The method as claimed in claim 1, wherein a history of retrievals is recorded with respect to each one of user groups, and when a plurality of pieces of retrieved information are obtained from a plurality of libraries, the pieces of retrieved information are ranked according to frequency of retrievals of respective libraries based on the history of retrievals before being provided to the requesting party.

5. The method as claimed in claim 1, wherein a history of retrievals is recorded with respect to each one of users, and a summary is stored with respect to each piece of the standardized knowledge information, and wherein a summary of the retrieved information is sent to users who frequently retrieve information relating to the retrieved information based on the history of the retrievals.

6. The method as claimed in claim 1, wherein a history of retrievals is recorded with respect to each one of users, and wherein the history of retrievals is accessed when the standardized knowledge information is updated, so that updated information or a summary thereof is sent to users who frequently retrieve information relating to the updated standardized knowledge information.

7. A system for collecting, storing, and retrieving knowledge, comprising:
   terminals used for registering information and making a first retrieval request via a network;
   at least one information center including:
      a knowledge-information collecting unit which collects knowledge information from said terminals via the network, the knowledge information including information regarding research and development, problems, and solutions of the problems;
      a library which stores the collected knowledge information by classifying the collected knowledge information based on a type and an attribute of the collected knowledge information;
      an important-information extracting unit which extracts the stored knowledge information based on importance and frequency of use; and
      a standardizing unit which stores the extracted knowledge information in the library after standardizing the extracted knowledge information so as to be usable by others;
   at lest one retrieval device which retrieves the standardized knowledge information from the library of a corresponding one of said at least one information center in response to a second retrieval request received via the network; and
   a retrieval mediating device which selects one of said at least one information center in response to the first retrieval request made by one of said terminals via the network so as to provide the second retrieval request to a corresponding one of said at least one retrieval device, and sends retrieved information obtained from the selected one of said at least one information center to the one of said terminals.

8. The system as claimed in claim 7, wherein the standardized knowledge information stored in said library is grouped according to the type, the attribute, an area, and a group to which said library belongs is identified based on contents of the first retrieval request so that said library is subjected to retrieval of information.

9. The system as claimed in claim 7, wherein said retrieval mediating device defines user groups, and records libraries frequently used by a given one of the user groups by using library IDs, and selects a library to be subjected to retrieval of information based on the library IDs.

10. The system as claimed in claim 7, wherein said retrieval mediating device records a history of retrievals with respect to each one of user groups, and when a plurality of pieces of retrieved information are obtained from a plurality of libraries, the retrieval mediating device ranks the plurality of pieces of retrieved information according to frequency of retrievals of respective libraries based on the history of retrievals before providing the plurality of pieces of retrieved information to a requesting terminal.

11. The system as claimed in claim 7, wherein said at least one information center further generates and stores a summary with respect to a corresponding piece of the standardized knowledge information, and wherein said retrieval mediating device records a history of retrievals with respect to each one of users, and, based on the history of retrievals, sends the summary of the retrieved information to users who frequently retrieve information relating to the retrieved information.

12. The system as claimed in claim 7, wherein said retrieval mediating device records a history of retrievals with respect to each one of users, and accesses the history of retrievals when the standardized knowledge information is updated in the library, so as to send updated information or a summary thereof to users who frequently retrieve information relating to the updated standardized knowledge information.

13. A computer-readable medium having programs embodied therein for collecting, storing, and retrieving knowledge, said programs comprising:
   knowledge-information collecting means for causing an information center to collect knowledge information, the knowledge information including information regarding research and development, problems, and solutions of the problems;
   knowledge-information-storage means for causing said information center to store the collected knowledge information in a library by classifying the collected knowledge information based on a type and an attribute of the collected knowledge information;
   important-information extracting means for causing said information center to extract the stored knowledge information from the library based on importance and frequency of use; and
   standardizing means for causing said information center to store the extracted knowledge information in the library after standardizing the extracted knowledge information so as to be usable by others;
   retrieval means for causing a retrieval device to retrieve the standardized knowledge information from the library of a corresponding one of information centers in response to a first retrieval request received via the network;
   retrieval requesting means for causing a retrieval mediating device to select one of said information centers in response to a second retrieval request received via the network, and to provide the first retrieval request to a corresponding one of retrieval devices; and
   retrieved-information transmitting means for causing said retrieval mediating device to send retrieved information obtained from the selected one of said information centers to a requesting terminal which made the second retrieval request.

* * * * *

UNITED STATES PATENT AND TRADEMARK OFFICE
CERTIFICATE OF CORRECTION

PATENT NO.    : 6,523,044 B1
DATED         : February 18, 2003
INVENTOR(S)   : Tetsuya Muramoto et al.

It is certified that error appears in the above-identified patent and that said Letters Patent is hereby corrected as shown below:

<u>Title page,</u>
Item [73], Assignee, change "Kanagawa" to -- Kawasaki --.

Signed and Sealed this

Fifth Day of August, 2003

JAMES E. ROGAN
*Director of the United States Patent and Trademark Office*